Patented Sept. 4, 1934

1,972,847

UNITED STATES PATENT OFFICE 1,972,847

STABLE HEATING MEDIUM

Max M. Levine and Herbert J. Krase, Anniston, Ala., assignors to Swann Research Incorporated, a corporation of Alabama No Drawing. Application December 19, 1931, Serial No. 582,179

5 Claims. (Cl. 252—5)

This invention relates to compositions of matter and particularly to certain mixtures of aromatic hydrocarbons of high molecular weight and high boiling point, which may be used as high temperature heat transfer media.

One object of this invention is the provision of a composition of matter, which will be useful for high as well as low temperature heating applications. Another object is the provision of a high temperature heating composition which will, when subjected to decomposing temperatures, reach an equilibrium composition and will not suffer additional further decomposition, at least so far as deposition of carbon is concerned.

The use of diphenyl or diphenyl oxide, either alone or in combination for high temperature heating applications, has, of course, long been known.

These substances, however, on heating above the decomposition temperature apparently continue to decompose without reaching a steady state. At all events the decomposition is progressive and the equilibrium condition on decomposition corresponds apparently to the presence of only a very small amount of the original material. For this reason these materials are limited in their field of usefulness to temperatures in the neighborhood of 750° F. or below.

We have now discovered that by the addition of a fairly pure grade of naphthalene to diphenyl or diphenyl oxide and in particular to mixtures of these two substances, we are enabled to use these materials at a much higher temperature. When employing these materials or mixtures together with naphthalene, some decomposition, of course, takes place, but it quickly reaches a steady state after which further decomposition is not apparent.

By means of our invention, we may also produce mixtures having a much lower freezing point than when using only diphenyl and diphenyl oxide in combination. For example by combining diphenyl, diphenyl oxide and naphthalene in the proper proportions, we may reach a freezing point as low as 5.7° C. Mixtures having low freezing points are of value since they enable the circulating system to be more easily started in cold weather without resort to auxiliary heating appliances.

In order that others may practice our invention, we will describe several means by which our invention may be utilized, although it is to be understood that we do not wish to be limited thereby except as defined in the claims.

Heat together a mixture of 60 parts of technical diphenyl oxide, 12 parts of naphthalene and 28 parts of technical diphenyl, and charge to a boiler or heat absorber which is to be used in connection with a high temperature cracking still or other device where high temperature heat is necessary. This mixture has the property of freezing as low as 5.7° C., which is the lowest freezing point which we have been able to discover using mixtures of the three substances mentioned above. Such a mixture may be referred to as having the eutectic composition. When heated at a temperature of 825° F. this mixture further has the property of decomposing for some 500 to 600 hours as indicated by a lowered freezing point, but after this period no further decomposition occurs. We may, of course, use this composition at considerably high temperatures without encountering a decomposition which will render the material inoperative.

While the composition set forth above will have the lowest freezing point possible using these three materials, in case a low freezing point is not essential, we may increase the naphthalene content at the expense of either of the other two constituents and obtain a material somewhat more stable thermally. For example, we may employ a mixture comprising 40 percent diphenyl, 20 percent diphenyl oxide, and 40 percent naphthalene and obtain therewith a freezing point of 36.8° C. Other mixtures embodying these three materials are also possible.

In order to obtain the most stable mixtures, it is desirable that a fairly pure grade of naphthalene be employed. For this purpose a sublimed naphthalene melting above 79.5° C. is desirable.

While we have described one application of high temperature heat using my composition other applications will, of course, occur to those skilled in the art. We may use this mixture in most process heating applications in the chemical and oil industry where diphenyl or diphenyl oxide has been used in the past. We may also employ it as a high temperature fluid in power generation in place of water or in the interstage reheating of steam.

It may further be employed as an insulating and cooling medium in electrical devices where it has hitherto been proposed to use diphenyl oxide alone or with other substances. In devices of this character it is desirable that the material be fluid at a low temperature and have a high boiling point. It should also be stable against the high temperatures of electrical descriptive discharges, such as occur when used as an insulating and cooling medium in oil filled switches.

Other applications will, of course, occur to one skilled in the art.

Having now particularly described our invention, what we claim is:—

1. A stable heat transfer medium comprising a mixture of 60 parts of diphenyl oxide, 12 parts of naphthalene and 28 parts of diphenyl, said mixture having a freezing point in the neighborhood of 5.7° C.

2. A heat transfer medium, stable at high temperatures, comprising a mixture of approximately 60 parts of diphenyl oxide, 12 parts of naphthalene having a freezing point above 79.5° C., and 28 parts of diphenyl, said mixture having a freezing point in the neighborhood of 5.7° C.

3. A heat transfer and insulating medium comprising a mixture of diphenyl, diphenyl-oxide and naphthalene, the naphthalene being present in amount ranging from 12 percent to 40 percent of the combined weights of the diphenyl and diphenyl oxide in said medium.

4. A stable heat transfer medium consisting of a mixture of diphenyl, diphenyl-oxide and naphthalene, the naphthalene amounting to from 12% to 40% by weight of said medium.

5. A heat transfer medium comprising diphenyl, diphenyl oxide and naphthalene in substantially eutectic proportions.

MAX M. LEVINE.
HERBERT J. KRASE.